Patented Aug. 14, 1951

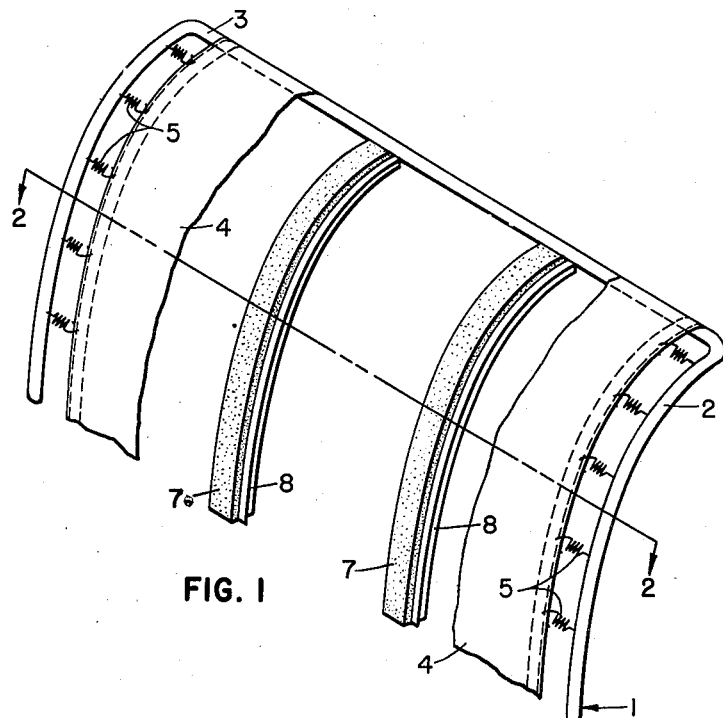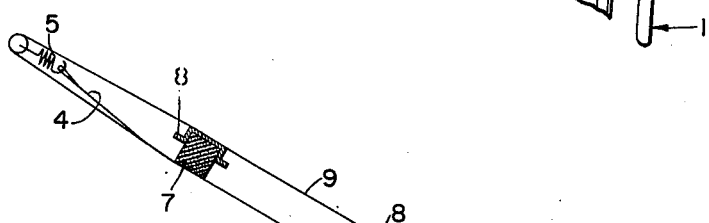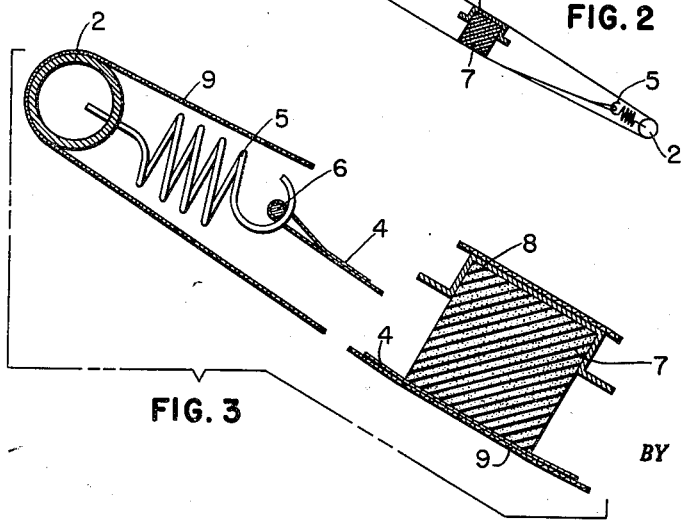

2,564,621

UNITED STATES PATENT OFFICE 2,564,621

SEAT COMBINATION

Keith L. Emberson, Akron, Ohio, assignor to Wingfoot Corporation, Akron, Ohio, a corporation of Delaware Application September 20, 1946, Serial No. 698,178

6 Claims. (Cl. 155—179)

This invention relates to seats, for example, automobile, furniture, theatre, and like seats, and, more particularly, to light-weight, space-saving, and inexpensive seat backs, preferably those formed with curved contours to achieve "posture chair" effects.

Heretofore, hundreds and even thousands of types of seats from the simple stump to a complicated operating chair have been built for one purpose or another, and incorporating one or more structural features. The fact remains that in spite of this development over a period of many centuries, present day seats, in many instances, do not have satisfactory support characteristics. And this is true whether or not the seat is a fancy and expensive lounge chair for the home, a deep and luxurious chair in a parlor car, or a rich and wonderfully upholstered automobile seat. Moreover, the average seat is a relatively heavy, space-consuming, and expensive structure even when built by or for an automobile company for incorporation in one of the mass produced so-called "low price class" automobiles.

It is the general object of the invention to avoid and at least partially overcome the foregoing and other difficulties of and objections to known seat structures by the provision of a relatively light-weight, inexpensive seat, and, particularly, a seat back, which is characterized by occupying a minimum of space, a factor highly important in the automobile field, but which possesses "posture chair" features and a high degree of comfort over long periods of use.

The foregoing objects of the invention, and other objects which will become apparent as the description proceeds, are achieved by the provision of a seat including a framework, flexible sheet means associated with the framework, resilient means at least partially securing the sheet means to the framework, cellular rubber means in elongated areas resiliently supporting the sheet means, and means carried by the framework for supporting the cellular rubber means.

For a better understanding of the invention, reference should be had to the accompanying drawings, wherein:

Fig. 1 is a perspective view, partly broken away, of an automobile seat back incorporating the principles of the invention;

Fig. 2 is a horizontal cross-sectional view, taken on substantially line II—II of Fig. 1 with final cover added; and Fig. 3 is an enlarged fragmentary view illustrating in greater scale certain of the details shown in Fig. 2.

It will be appreciated that the principles of the invention may be employed in conjunction with seats of various types and adapted for various uses, however, the space saving advantages of the invention, and the comfort characteristics, are particularly adapted for use in conjunction with automobile seat backs, and, therefore, the invention has been so illustrated and will be so described.

In the drawings, the numeral 1 indicates a framework specifically for a seat back, and although the framework may obviously take a variety of forms, and can be constructed from wood, sheet metal, or other known materials, one convenient manner of making the frame 1 is to make it from a continuous length of tubing in the form shown to provide upright portions 2 and a top portion 3. The frame is backwardly curved from the bottom to the top, in the manner shown, and it is an important part of the invention that the curvature be such as to adapt the seat to the greatest comfort and fatigue resistance of the user. Particularly, the curve on the back can be concentrated in the small of the back to achieve a "posture chair" effect, a head rest may be incorporated, or other desired results or combinations.

Associated with the frame 1 is a flexible cover sheet 4, and the flexible sheet 4 is at least partially resiliently secured to the framework. It is most convenient to secure the upper edge of the flexible sheet 4 directly to the top 3 of the framework, and to support the sides of the sheet 4 by resilient means on the sides 2 of the framework. One manner of securing the sides of the sheet 4 to the sides of the framework is by the provision of a plurality of coiled tensioned springs 5 which are fastened at one end to the framework, and at their other end to the edges of the flexible sheet 4 spaced from the sides 2 of the framework.

The flexible sheet 4 may be canvas, glass fabric, flexible sheet metal, or the like, but is usually in the form of some flexible fabric material having wires 6 secured in the vertical edges thereof around which wires the springs 5 hook, in the manner best shown in Fig. 3 of the drawings.

In order to assist in supporting the relatively wide reaches of the flexible sheet 4 to the desired contours, an important feature of the invention is to use strips of cellular or sponge rubber of considerable thickness and cushioning abilities, and, for example, having substantially square cross sections, in vertically-extending, but relatively narrow areas at one or a plurality of points between the uprights 2 of the frame.

Such cellular rubber means have been indicated by the numeral 7, and are shown positioned at laterally spaced points behind the flexible sheet 4, it being recognized that the cellular rubber strips are curved to the contour, or to substantially the contour of the side frames 2, and closely engage and support with the flexible sheet 4 in elongated vertical areas.

Supporting means of suitable character are associated with the back or under side of the cushioning strip 7, and such supporting means may take the form of sheet metal channels 8 which are connected at their upper end to the top 3 of the framework and at their bottom ends to the bottom of the framework (not shown). The supporting channels 8 are obviously curved to substantially the contour of the sides 2 of the framework so that the seat provided is relatively shallow and offers a maximum of knee room in the back seat of an automobile when the seat back herein described is used in the front seat of the automobile.

The cushioning strips 7 have been found to be very advantageous in a relatively wide seat, such as used in automobiles, or in conjunction with a davenport or other means adapted to seat several people simultaneously. The cushioning means prevent the flexible sheet 4 from sagging or become dislocated between the sides 2 of the framework. Obviously, more than two of the cushioning strips 7 can be utilized, particularly upon a davenport or other long seat, and even in conjunction with an automobile seat. However, ordinarily two of the cushioning strips upon an automobile seat of usual width are satisfactory. In a narrow seat, for example that adapted to seat only a single person, only one of the cushioning strips 7 may be employed, although two cushioning strips adapted to contact on either side of the spine of the user of the seat provide a very comfortable support for the user of the seat and at the same time insure a maintenance of the desired curvature, or substantially desired curvature, upon the surface of the seat.

From the foregoing, it will be recognized that the various objects of the invention have been achieved by the provision of a relatively light weight, inexpensive, space saving seat back having a very high degree of comfort. Moreover, an important feature so far as the comfort is concerned, is that pressure concentration between the seat and the user are avoided for the reason that the flexible sheet 4 acts in the same capacity as a hammock or canvas lawn chair to provide a much more uniform pressure distribution than is possible in a seat utilizing helically coiled or other metal springs.

While in accord with the patent statutes, one particular embodiment of the invention has been illustrated and described in detail, it is to be definitely understood that the invention is not limited thereto or thereby, but that the scope of the invention is defined in the appended claims.

What is claimed is:

1. A seat back including a framework having a backward curve between the bottom and the top, a flexible sheet covering the framework, said sheet being fastened directly to the top of the back, spring means fastening the sides of the sheet to the sides of the framework, cellular rubber means extending upwardly of the back in spaced relation to the sides of the framework and closely supporting and following the contour of the underside of the sheet, and means supporting the side of the rubber remote from the sheet, said rubber being sufficiently thick to provide the desired cushioning action.

2. A seat back including a framework having a backward curve between the bottom and the top, a flexible sheet covering the framework, said sheet being fastened to the top and the sides of the framework, cellular rubber strips extending upwardly of the back and relatively widely spaced from the sides of the framework and closely supporting and following the contour of the underside of the sheet, and means supporting the side of the rubber remote from the sheet, said rubber being sufficiently thick to provide the desired cushioning action.

3. A seat back including a framework, flexible sheet means associated with the framework, resilient means at least partially securing the sheet means to the framework, cellular rubber means in elongated areas resiliently supporting the sheet means at uniformly spaced portions intermediate the sides of the framework, and means carried by the framework for supporting the cellular rubber means.

4. A seat including a framework curved in one direction, flexible sheet means associated with the framework and likewise curved in one direction, resilient means at least partially securing the sheet means to the framework, cellular rubber means in elongated areas in the direction of the plane of the arc of the curve and resiliently supporting the sheet means, means carried by the framework for supporting the cellular rubber means, the framework having an open center portion with the flexible sheet means, resilient means, cellular rubber means and rubber support means all lying within the center portion of the framework, and cover means secured over the framework to complete the seat.

5. A seat including a framework having sides and one end portion and being curved in one direction, said framework defining a surface having a curve therein, flexible sheet means, resilient means engaged with the side portions of said framework to secure said sheet means tautly therein, cellular rubber strips associated with the back surface of said sheet means in substantially parallel relation to the sides of said framework but spaced appreciably therefrom, means supporting said rubber strips against said sheet means, all of said sheet means, resilient means, cellular rubber strips and support means lying in the plane of said framework, and cover means extending over both surfaces of said framework to enclose the means associated therewith and form a seat therefrom, said cover means lying in the plane of said framework.

6. In a seat, the combination of a flexible sheet, frame means resiliently supporting the sheet on a curve, and strips of cellular rubber positioned behind the sheet and assisting to contour and resiliently support the sheet on the curve at spaced portions of the sheet relatively widely spaced from a pair of opposed margins thereof, and means carried by the frame means for supporting the cellular rubber.

KEITH L. EMBERSON.

REFERENCES CITED

The following references are of record in the file of this patent:

UNITED STATES PATENTS

| Number | Name | Date |
| --- | --- | --- |
| 2,008,158 | Van Dresser | July 16, 1935 |
| 2,085,475 | Saives | June 29, 1937 |
| 2,185,758 | Todd et al. | Jan. 2, 1940 |
| 2,281,341 | Turner | Apr. 28, 1942 |
| 2,311,104 | Will | Feb. 16, 1943 |
| 2,335,234 | Caesar et al. | Nov. 30, 1943 |
| 2,421,851 | Rivard et al. | June 10, 1947 |